United States Patent Office 3,741,937
Patented June 26, 1973

3,741,937
ALKYD RESINS INCLUDING CYCLOHEXANE MONOCARBOXYLIC ACID AS A COMPONENT THEREOF
Heinz Ehring, Krefeld-Verberg, and Bernd Peltzer, Krefeld-Bockum, Germany, assignors to Bayer Aktiengesellschaft, Leverkusen, Germany
No Drawing. Filed Jan. 3, 1972, Ser. No. 215,101
Claims priority, application Germany, Jan. 7, 1971,
P 21 00 446.6
Int. Cl. C08g 17/14; C09d 3/64
U.S. Cl. 260—76                                                1 Claim

ABSTRACT OF THE DISCLOSURE

The invention relates to alkyd resins containing residues of at least one cycloaliphatic monocarboxylic acid.

---

The present invention relates to new oil-free alkyd resins and to their use in stoving lacquers.

In the manufacture of stoving lacquers, especially those which contain urea-formaldehyde or melamine-formaldehyde resins as crosslinking agents, oil-modified or fatty acid-modified alkyd resins, preferably those containing between 25 and 40% of oil, are employed in a known manner.

The abovementioned modification with saturated or unsaturated natural or synthetic oils or fatty acids imparts to these resins the known good technical lacquer properties such as, say, pigment wetting, levelling or gloss. The important advantage in their use however resides in the plasticisation of the resulting lacquer films which is thus achieved. Oil-modified or fatty acid-modified alkyd resins in all cases show excellent compatibility with urea-formaldehyde or melamine-formaldehyde condensation resins and good solubility in the solvents which are customary in stoving lacquers, such as, for example, toluene, xylene, butanol, ethyl acetate or butyl acetate.

Oil-modified or fatty acid-modified alkyd resins however suffer from the following technical disadvantages in use:

If unsaturated oils or their fatty acids are employed for modifying the alkyd resins, such resins can be used to produce lacquer films of high elasticity and rapid deformability, such as are demanded, for example, when using these resins in the "coil coat" field. A disadvantage in such systems is, however, the relatively low resistance to yellowing under the influence of temperatures above 200° C., and a limited resistance to weathering.

When using saturated linear or branched aliphatic monocarboxylic acids, or natural oils containing these acids, as modifiers, the abovementioned yellowing can admittedly be avoided, but lacquer films based on such materials do not show the requisite elasticity, especially on rapid deformation, if they are adjusted to the film hardness which is customary in practice.

Attempts have already been made to overcome the indicated disadvantages of the lacquer films by employing oil-free alkyd resins or polyesters. These resins are rendered elastic by the incorporation of aliphatic dicarboxylic acids, such as adipic acid and/or sebacic acid and/or diols, such as 1,4-butanediol, 1,6-hexanediol and/or neopentyl glycol. When using such oil-free alkyd resins, lacquer films of good deformability and good resistance properties result. However, the ability to combine these oil-free resins with melamine-formaldehyde condensation resins is very greatly restricted because of inadequate compatibility.

Additionally, the solubility of these resins, for example in aromatic hydrocarbons, is relatively restricted.

It has now been found, surprisingly, that the indicated shortcomings of oil-free alkyd resins, such as inadequate scope for combination with, for example, melamine-formaldehyde condensation resins and inadequate ease of dilution with aromatic solvents can be overcome if, in the manufacture of the oil-free alkyd resins, cycloaliphatic monocarboxylic acid, such as cyclohexanemonocarboxylic acid, p-tert.-butylcyclohexanemonocarboxylic acid and the like are used as chain stoppers in amounts of 10–50 percent by weight, preferably 20–35 percent by weight, relative to the total resin.

Additionally, in contrast to the aliphatic monocarboxylic acids, such as, for example, short-chain saturated fatty acids of carbon chain length $C_7$–$C_{12}$, usually employed as chain stoppers in the manufacture of alkyd resins, these cycloaliphatic monocarboxylic acids do not show a plasticising action, thus retaining the possible use of internal plasticisation, which is of great advantage for oil-free alkyd resins, by conjoint use of plasticising components such as, for example, aliphatic dicarboxylic acids or diols.

Accordingly the present invention now provides oil-free alkyd resins containing 10–50 wt. percent, preferably 20–35 wt. percent, based on the resin, of residues of at least one cycloaliphatic monocarboxylic acid.

The invention also provides lacquers comprising a resin according to the invention and a solvent.

The lacquers of the invention preferably contain, as well as the oil-free alkyd resin according to the invention, an amine resin, preferably a melamine-formaldehyde resin.

If aromatic monocarboxylic acids, such as, for example, benzoic acid, are employed as chain stoppers, these resins can admittedly also be plasticised by the components mentioned, such as aliphatic dicarboxylic acids and/or diols, but such resins remain inadequate as regards the capacity for combination with amino resins and/or the ease of dilution with aromatic lacquer solvents.

The non-plasticising, but compatibility-promoting action of the cycloaliphatic monocarboxylic acids is also of advantage in the manufacture of oil-modified alkyd resins. In this way, alkyd resins which contain less oil and are therefore harder, but elastic, can be manufactured without losing their good properties as regards, for example, compatibility with amino resin.

Of even greater interest with regard to oil-containing alkyd resins is the improvement in the ease of dilution with non-polar solvents, such as xylene and/or aliphatic benzine fractions (with boiling points between about 100–200° C.), if hexahydrobenzoic acid is employed in accordance with the invention instead of benzoic acid.

The subject matter of the present invention therefore also includes oil-containing alkyd resins with a content of 3 to 30% by weight, preferably 5 to 15% by weight, based on the oil-containing alkyd resin, of residues of at least one cycloaliphatic monocarboxylic acid.

The alkyd resins according to the invention can be manufactured in accordance with the known processes which are customary for alkyd resins, with or without the use of inert solvents and/or protective gases to remove the water of reaction which is formed. Apart from the unsubstituted and substituted cycloaliphatic monocarboxylic acids used according to the invention, such as, for example, cyclohexanemonocarboxylic acid, cyclopentanemonocarboxylic acid, the monocarboxylic acids of partially or completely hydrogenated naphthalene and/or p-tert.- butyl-cyclohexanemonocarboxylic acid, all dicarboxylic acids, diols and higher-functional polyols which are customary in the manufacture of alkyd resins can be employed as reactants.

Suitable polycarboxylic acids or polycarboxylic acid anhydrides for the preparation of oil-free and oil-containing alkyd resins are, for example, phthalic acid or phthalic acid anhydride, isophthalic acid and terephthalic acid, tetra- or hexahydrophthalic acid anhydride, adipinic acid, sebacic acid and trimellitic acid anhydride.

Suitable polyalcohols are ethylene glycol, propylene glycol, 1.3-butylene glycol, neopentyl glycol, 1.6-hexane diol, glycerol, trimethyol propane, trimethylol ethane and pentaerythrite.

Additional polycarboxylic acids and polyalcohol for the preparation of oil-free alkyd resins are, for example, given in the German Offenlegungsschrift 1,805,198.

For the preparation of oil-containing alkyd resins there are used in addition the long-chain monocarboxylic acids resulting from the natural oils, such as for example oleic acid, linoleic acid, linolenic acid, ricinoleic acid, stearic acid as well as the mixtures of monocarboxylic acids accurring in the natural oils, such as for example soya oil fatty acid, linseed oil fatty acid, castor oil fatty acid or ground nut oil fatty acid.

For the preparation of oil-containing alkyd resins, the glycerides (oils) themselves of long-chain monocarboxylic acids can also be employed.

The molecular weights of the oil-free alkyd resins in accordance with the invention are preferably between 1000 and 4000, those of the oil-containing alkyd resins in accordance with the invention between 1500 and 6000.

The acid numbers of the oil-free and oil-containing alkyd resins lie between 5 and 50, preferably between 10 and 20. The hydroxyl numbers of the oil-free alkyd resins lie between 30 and 200, preferably between 60 and 120, the hydroxyl numbers of the oil-containing alkyd resins between 10 and 100, preferably between 20 and 70.

For the manufacture of stoving lacquers, the oil-free alkyd resins according to the invention are combined with the customary amino resins in a mixing ratio which is between 95:5 and 50:50% by weight, preferably between 85:15 and 70:30% by weight. The restriction, which frequently applies when using oil-free alkyd resins, to amino resins of the type of hexamethoxymethylmelamine resins as condensation resins, does not apply in the case of the alkyd resins manufactured according to the present invention; rather, these show excellent compatibility even with partially etherified, so-called "reactive," melamine resins.

The so-called "reactive" melamine resins are reaction products of between 3 and 5 moles formaldehyde per mole melamine. About 66% of the methylol groups of these reaction products are etherified with butylic or isobutylic alcohol.

Solutions of these resins in butylic alcohol, isobutylic alcohol or in mixtures of these alcohols e.g. with xylene having between about 55% and 60% by weight of the resin, are commercially available.

The oil-containing alkyd resins of the invention are used for the preparation of air-drying and stoving lacquers.

EXAMPLE 1

To illustrate the present invention, five different alkyd resins, the composition of which is given in Table 1, were first manufactured under conditions as identical as possible. The particular raw material mixtures were heated to 200° C. over the course of 7 hours, whilst stirring and passing nitrogen through the mixture, and were esterified under these conditions over the course of 14–18 hours, until the acid number had dropped to values between 10 and 15. The finished resins were dissolved particularly in xylene and, if the solubility was inadequate, in a mixture of xylene/n-butanol, the resin content being 60 percent by weight.

TABLE 1

| Resin | A | B | C | D | E |
|---|---|---|---|---|---|
| α-Ethylhexanoic acid acid | 25.31 | | | | |
| Benzoic acid | | 25.21 | 22.31 | | |
| Cyclohexanemonocarboxylic acid | | | | 25.31 | 23.15 |
| Trimethylolpropane | 32.30 | 32.30 | 33.59 | 32.30 | 33.24 |
| Pentaerythritol | 4.64 | 4.64 | 4.82 | 4.64 | 4.76 |
| Phthalic anhydride | 22.77 | 22.77 | 23.70 | 22.77 | 23.43 |
| Adipic acid | 14.98 | 14.98 | 15.58 | 14.98 | 15.42 |
| Monocarboxylic acid content in the finished resin, percent | 28.0 | 28.2 | 24.8 | 28.1 | 25.7 |
| Acid number | 13.7 | 17.0 | 17.0 | 15.5 | 14.0 |
| Viscosity of a 50% strength solution in xylene | 67″ | [1] 86″ | [1] 110″ | 62″ | 81″ |
| OH number | 106 | 83 | 111 | 93 | 109 |

[1] In the case of resins B and C, a mixture of 8 parts of xylene and 2 parts of n-butanol was used as the solvent.

The parts shown in the table are parts by weight. The viscosity values were obtained in measurements using a DIN-cup/4 mm. nozzle, at 20° C. The average molecular weights of the resins are between 1,200 and 1,800.

In the case of resins B and D, the α-ethylhexanoic acid on which resin A was based was replaced weight for weight, and in case C and E mol for mol, by benzoic acid or cyclohexane-monocarboxylic acid. Resins D and E correspond to the present invention.

To test the compatibility with melamine resins, the alkyd resins described in Table 1 were mixed with 10–100 parts by weight of a series of partially butylated, commercially available melamine resins of differing degree of etherification. The mixtures thus obtained were stoved for 30 minutes at 130° C. on glass plates and the compatibility was assessed from the degree of cloudiness of the films produced. The results thus obtained are listed in Table 2.

Additionally, Table 2 shows the improved solubility properties of the resins according to the invention in aromatic solvents such as, for example, xylene.

TABLE 2

| | Compatibility with melamine resins | Solubility in xylene |
|---|---|---|
| Resin: | | |
| A | Compatible | Soluble. |
| B | Incompatible | Insoluble. |
| C | do | Do. |
| D | Compatible | Soluble. |
| E | do | Do. |

To compare the technical properties of the resins A–E when used in lacquers, five white stoving lacquers, each of the same composition, were manufactured in a known manner. Here, the resins were combined with a commercially available partially butanol-etherified melamine-formaldehyde resin and pigmented with $TiO_2$ in a weight ratio of 1:0.8 (relative to solids). The test lacquers were sprayed onto glass plates and onto 0.1 or 0.5 mm. thick steel sheets and were stoved for 30 minutes at 130° C. The test results obtained are summarised in Table 3.

TABLE 3

| Lacquer from resin | A | B | C | D | E |
|---|---|---|---|---|---|
| Gloss according to Gardner, 20° angle | 75 | [1] 4 | [1] 4 | 79 | 83 |
| Pendulum hardness according to König | 31″ | 128″ | 125″ | 130″ | 125″ |
| Erichsen deep-drawing in mm | 8.3 | 0.9 | 3.8 | 6.5 | 7.9 |

[1] The conspicuously low values of the gloss and Erichsen deep-drawing of the resins B and C, which are modified with benzoic acid, are attributable to the inadequate compatibility of these resins with melamine-formaldehyde resins.

EXAMPLE 2

An oil-free alkyd resin was also manufactured according to the process described in Example 1, using p-tert.-butylcyclohexanemonocarboxylic acid, and compared, as regards the technical properties of lacquers, with an alkyd resin obtained by a molar replacement of this acid by p-tert.-butylbenzoic acid. The compositions, characteristic data and results ase regards the technical properties of lacquers can be seen in Table 4.

TABLE 4

| Resin | F | G |
|---|---|---|
| Parts by weight of p-tert.-butylcyclohexanemonocarboxylic acid | 30.41 | |
| Parts by weight of p-tert.-butylbenzoic acid | | 29.30 |
| Parts by weight of trimethylolpropane | 30.97 | 31.46 |
| Parts by weight of pentaerythritol | 4.52 | 4.59 |
| Parts by weight of phthalic anhydride | 13.76 | 13.98 |
| Parts by weight of adipic acid | 20.34 | 20.67 |
| Content of monocarboxylic acid in the finished resin, percent | 33.65 | 32.47 |
| Acid number | 6.4 | 12.6 |
| Viscosity, 50% strength in xylene, DIN-cup 4 at 20° C | 94″ | 78″ |
| OH number | 123 | 126 |
| Compatibility with melamine resins | (¹) | (²) |
| Solubility in xylene | Soluble | (³) |
| Gloss according to Gardner, 20° angle | 80 | 82 |
| Pendulum hardness according to König | 170″ | 175″ |
| Erichsen deep-drawing in mm | 8.6 | 6.2 |

¹ Compatible.
² Limited Compatibility.
³ Limited solubility.

EXAMPLE 3

According to the process described in Example 1, an oil-containing alkyd resin was prepared from 31.0 parts by weight of soya oil fatty acid, 7.9 parts by weight of hexahydrobenzoic acid, 26.0 parts by weight of trimethylol propane, 5.9 parts by weight of pentaerythrite and 36.8 parts by weight of phthalic acid anhydride. The characteristics data can be seen from Table 5. Content of cycloaliphatic monocarboxylic acid in the finished resin is 7.9% by weight.

EXAMPLE 4

As a comparison with Example 3 an alkyd resin was prepared on the basis of benzoic acid from 31.0 parts by weight of soya oil fatty acid, 7.5 parts by weight of benzoic acid (molar substitution of the hexahydrobenzoic acid), 26.1 parts by weight of trimethylolpropane, 6.0 parts by weight of pentaerythrite and 37.0 parts by weight of phthalic acid anhydride.

TABLE 5

| Resin from example | 3 | 4 |
|---|---|---|
| Acid number | 10.4 | 11.7 |
| Hydroxyl number | 60 | 61 |
| Viscosity of a 50% solution in xylene | 55.0″ | 140.0″ |

What we claim is:

1. Alkyd resins having incorporated therein by cocondensation an aliphatic polyhydric alcohol, a benzenedicarboxylic acid, an aliphatic dicarboxylic acid and 10 to 50% by weight, based on the resin, of cyclohexane monocarboxylic acid.

References Cited

UNITED STATES PATENTS

| 2,729,609 | 1/1956 | Tess et al. | 260—76 |
| 2,734,876 | 2/1956 | Bradley | 260—76 |
| 2,967,840 | 1/1961 | Phillips et al. | 260—22 R |
| 3,425,974 | 2/1969 | Semroc | 260—21 |

FOREIGN PATENTS

| 708,123 | 4/1954 | Great Britain | 260—76 |

MAURICE J. WELSH, Primary Examiner

R. W. GRIFFIN, Assistant Examiner

U.S. Cl. X.R.

117—124 E, 132 B, 161 K; 260—21, 22 A, 22 CQ, 850